Figure 1:
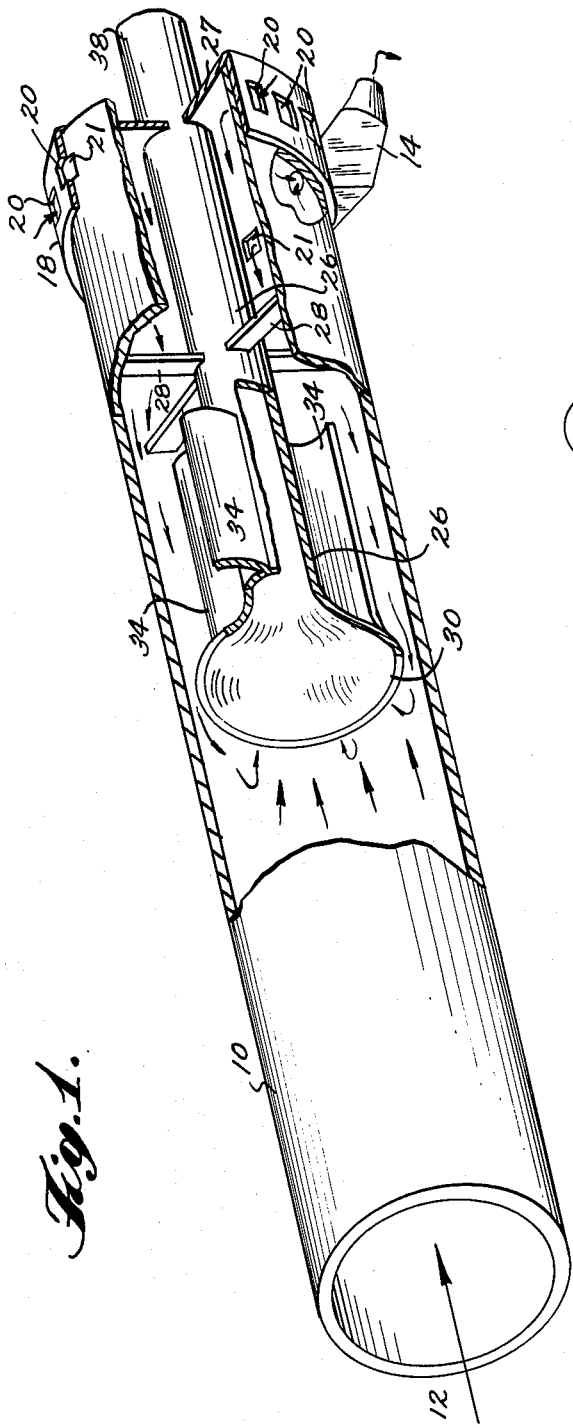

July 12, 1966  R. F. BROWN  3,259,999
COMBINATION COOLER-DRYER
Filed Nov. 26, 1963

INVENTOR
RICHARD F. BROWN

BY Cushman, Darby & Cushman
ATTORNEYS

United States Patent Office 3,259,999
Patented July 12, 1966

3,259,999
COMBINATION COOLER-DRYER
Richard F. Brown, Savannah, Ga., assignor to Southern Nitrogen Company, Inc., Savannah, Ga., a corporation of Georgia
Filed Nov. 26, 1963, Ser. No. 326,055
7 Claims. (Cl. 34—135)

The present invention relates to an apparatus and method for drying and cooling moist or wet solids. The invention is of especial importance in its application to the drying and cooling of soft agglomerates comprising plant foods or fertilizers although the treatment of other types of solids is also contemplated.

In the process of manufacturing solid materials, it is frequently necessary to remove moisture from the solid product by passing the same through a rotary drum that is ventilated with heated air. It may then be necessary to cool the dried material for subsequent storage and this is usually done by passing the solid material through another rotating drum which is ventilated by cooling air. In some cases, the drying process is carried out in such a manner that the air and solid material pass through the drum in a co-current fashion. In some instances, the air and solid material are counter-current to each other. Likewise, in the cooling step, in some cases the solid material and air are co-current and in other cases they are counter-current.

It has also been previously disclosed (U.S. Patent 2,677,195) to provide a combination drying and cooling apparatus wherein solid material is first preheated by infra-red means and then dried by hot air flowing in co-current fashion with respect to the solid material followed by cooling with air flowing counter-currently. This type of apparatus may be used for the drying and cooling of solid materials which are already in the form of discrete particles at the time of the pretreatment, e.g. coffee or grain. The pretreatment causes the individual granules to be heated in their entire cross section and surface evaporation takes place later when they are contacted with heated air in co-current flow. However, this type of treatment is not feasible for drying soft agglomerates as encountered in the manufacture of fertilizers or plant foods wherein each agglomerate comprises a solid phase in equilibrium with and surrounded by a solution phase made up of the solid dissolved in moisture. In drying such agglomerates, the internal temperature cannot be increased significantly, if a satisfactory product is to be obtained. On the contrary, it is necessary to evaporate the surface moisture to form a hardened crust on each particle and dry by a process of moisture migrating from the inside to the outside, where surface evaporation takes place. Each agglomerate is loosely held together by the solution phase surrounding the solid phase and the main objective is to evaporate the solution phase and produce hard, durable fertilizer pellets or the like without first breaking down the moist agglomerates.

As will be appreciated from the foregoing, the principal object of the invention is to provide certain novel improvements in the drying and cooling of moist solids, notably moist agglomerates of fertilizers or the like to obtain hard, durable and discrete particles possessing optimum physical characteristics.

Another object is to provide a method and apparatus whereby fertilizer agglomerates or the like may be continuously dried and cooled in essentially the same vessel using a co-current flow of drying air and a counter-current flow of cooling air.

Figure 2:
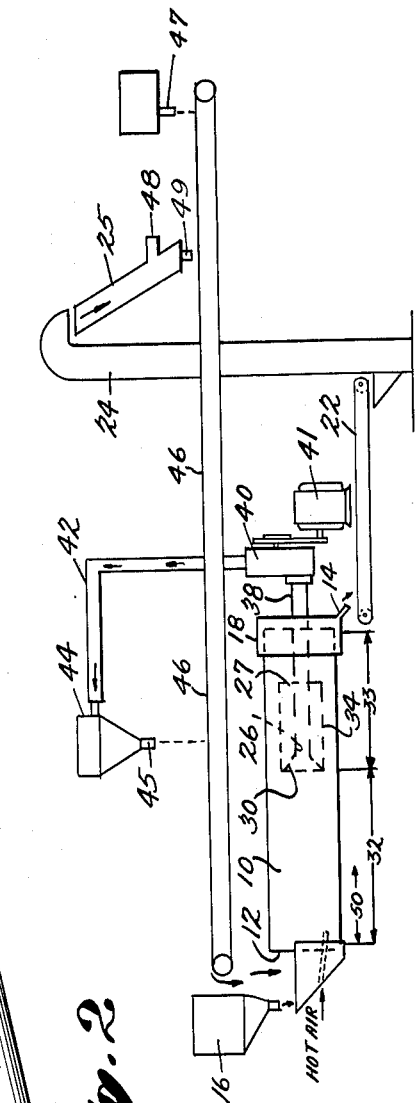

Other objects will also be hereinafter apparent from the following detailed description of the invention in conjunction with the accompanying drawings wherein:

FIGURE 1 is a perspective view, partly in section, showing a dryer-cooler according to the present invention; and FIGURE 2 is a diagrammatic view of a system using the dryer-cooler of the invention.

Referring to the drawings, there is shown in FIGURE 1 a rotatable drum 10 having an open inlet end 12 and a material discharge or outlet 14 at the other end thereof. Drum 10 may be horizontally disposed or set on an angle with the inlet end lower than the other end in which case means should be provided for moving the solid material through the drum. Preferably, however, the drum is arranged so that it is tipped downwardly towards the discharge end thereof to facilitate the passage of material therethrough.

Material to be dried and cooled may be fed into the inlet end 12 of drum 10 from an appropriate source of supply 16. The latter may comprise a suitable vessel for mixing and granulating one or more platnt foods, e.g. urea, ammonium nitrate, superphosphate, potash or combinations of these, with water. The resulting moist mass (usually containing 3–10% water) may be fed as shown into the inlet end 12 of the drum.

To effect the desired drying action, hot air is drawn or fed into drum 10 through the inlet end 12, as shown in FIGURE 2. This hot air may be obtained in any convenient fashion, e.g. by an appropriate combustion unit (not shown). The temperature of the air fed into drum 10 may be in the range of 250–800° F. and, if desired, cold air may be mixed with the hot gas before it enters the drum in order to obtain the desired temperature.

Cooling air is admitted to the drum at one or more points adjacent the discharge end thereof. This may be accomplished in any one of several ways. For example, in the embodiment illustrated, an adjustable collar 18 is fitted around the discharge end of drum 10. This collar is provided with apertures 20 which are adapted to communicate with the interior of drum 10 through corresponding apertures 21 in the drum. These apertures are used to allow atmospheric air or, if desired, specially conditioned air, to be sucked into the drum for cooling purposes as more fully described below. Collar 18 is rotatable with respect to the drum so that the amount of air entering the drum can be regulated by appropriate positioning of the apertures 20 with respect to the corresponding apertures 21 in the drum. In lieu of this collar arrangement, the end of the drum may be simply provided with one or more openings communicating with an appropriate room or other area having air at the desired temperature and pressure.

As best shown in FIGURE 1, there is concentrically disposed within drum 10, a conduit 26, the latter being mounted in the exit end 27 of the drum and so fixed thereto, for example, by means of the members 28, as to be rotatable therewith. This conduit 26 includes an open-entrance end 30 which is disposed inwardly a sufficient distance from inlet end 12 of drum 10 to provide a drying zone 32 of a linear dimension such that wet material introduced at end 12 is substantially dry before it reaches the conduit entrance end 30. Advantageously, the inlet end 30 is coneshaped as shown but this is not essential in all cases and the conduit 26 may in certain circumstances be uniform throughout in cross section. In some cases, it also may be advantageous to provide the conduit 26 with appropriate baffle means 34 adjacent the entrance end 30 as shown to facilitate and direct the cooling air flow.

Conduit 26 extends outwardly beyond the discharge end of drum 10 to provide an air outlet end 38. This end 38 is operatively associated with the suction side of an appropriate fan and blower arrangement 40 which serves to draw air through conduit 26, by means of motor 41. This withdrawn air, representing a combination of the cooling air and drying air from opposite ends of drum 10, along with any fines fluidized therein, may be blown through conduit means 42 as shown by the arrows in FIGURE 2 to a suitable cyclone separator 44, or the equivalent. The latter discharges the recovered fines as shown at 45 onto a conveyor belt or the like 46 carrying other makeup material added as at 47 back to supply 16 for another passage through drum 10.

It will be appreciated that the suction exerted through the exit end 38 of conduit 26 by means of motor 41 and the blower arrangement 40 draws the hot air fed into drum inlet 12 directly through conduit 26. Additionally, the suction draws cooling air through apertures 20 and 21 into drum 10 towards the inlet 30 of conduit 26 all as shown by the arrows in FIGURES 1 and 2 and then outwardly therethrough. It will thus be seen that the hot air flows co-currently with the solid material fed into the drum in drying zone 32 while the cooling air flows counter-currently around conduit 26 to cool the material at this end of the drum.

Drum 10 can be rotated in any siutable manner known in the art. This rotation, coupled with the angular disposition of the drum and/or postive means such as flights or screw conveyors within the drum, serves to advance the material fed into the drum towards discharge 14. Drying is effected by the hot air entering the inlet end and, as noted, the material is dried to the point desired by the time it reaches the conduit 26. From that point on to discharge, the material is cooled in a cooling zone 33 defined by the inner open end 30 of conduit 26 and the discharge end 14 of the drum. It will be recognized that the degree of drying and cooling will vary depending on the material being treated and the desired product. Suitable baffle means (not shown) may be positioned within the inlet end of drum 10 to direct the hot air in the desired direction, e.g. downwardly onto the moist mass of material from supply 16 or inwardly into the drum.

Residence time in the drum, temperature of the drying gas and cooling air, and rates of gas flow can be varied as desired to effect the necessary amount of drying and cooling. Usually, however, the residence time in the drying section 32 of the drum 10 will run in the neighborhood of 5–40 minutes depending, for example, on the amount of moisture to be removed. The cooling time in zone 33 may also fall within this range of 5–40 minutes although longer or shorter times may be used depending, of course, on the desired degree of cooling.

As indicated above, the cooling air admitted to drum 10 adjacent the discharge end thereof moves counter-current to the material being cooled, enters the internal duct 26 along with the drying air and then passes out of the drum. It is necessary to size the internal duct in cross section so that the linear velocity of the air leaving the duct will transport any solid materials that becomes entrained in the air stream. Air velocities are maintained in this section to fluidize dust and small particles that are carried out with the air stream to the cyclone collector 44 where they are recovered and reused, as mentioned heretofore. This air classification and separation of smaller particles leaves only the coarser and more desirable pellets to pass on through the cooler for discharge at outlet 14. The absence of smaller particles and dust in the product discharged at 14 makes the final screening and separation less troublesome.

With particular reference to FIGURE 2, it will be seen that the dried and cooled solid discharged at 14 may be dropped onto appropriate conveying means 22 from which the solids are elevated by suitable lifting means 24 which feed the material into a separartor 25. The product having the desired particle size may then be discharged from the system as shown at 48 while fines 49 may be deposited onto conveyor 46 for recycle back through the drum 10. Material of intermediate size, if desired, may be milled into fines and fed onto the conveyor for recycle.

One of the advantages of the arrangement described above is the possibility of using the entrance end of the drum 10 to convert the materials from supply 16 into agglomerates for subsequent drying and cooling. In other words, the drum can function as a combination granulator-dryer-cooler as shown in FIGURE 2. In conventional fertilizer plants, damp agglomerates are formed in a separate vessel ahead of the dryer and discharged into the dryer either from a chute or belt. This vessel, in which the agglomerates are formed, is usually a rotating drum or it may be a stationary drum with a series of rotating impellers. The name of this vessel is usually a granulator, blunger, or a pug mill but, in any case, it is necessary to maintain controlled conditions of temperature, solution phase and solid phase, plus mechanical motion to form the agglomerations.

In contrast to conventional practice, the present system makes it possible to eliminate the granulator, pug mill or blunger and perform the operation of making the agglomerates in the first portion of the dryer-cooler drum designated, for example, by the area defined by the numeral 50. In the conventional granulator, blunger or pug mill, it is usually necessary to add steam or to neutralize free acid with ammonia, producing plant foods in situ to bring the materials into the correct temperature range (this range being 200° F., plus or minus 50°). The necessity for using steam or neutralization may be eliminated in the present case by locating the hot gas inlet so that heat is transferred into the materials to be granulated and water may or may not be added near the inlet to provide the required degree of placiticity to cause agglomerations to take place.

It is believed that the operation of the combination dryer-cooler of the invention will be apparent from the foregoing description. Thus, heated air and moist solid to be dried (either in agglomerate or preagglomerate form) are charged in a continuous manner into the inlet end 12 of drum 10. If agglomerates are fed into the drum, the entire section of the drum from the inlet end to conduit 26 serves simply as a drying section. However, if the wet material is in preagglomerate form, the first portion of the drum may be used for granulating or agglomerating the fluid mass. This may be accomplished by baffling the hot air downwardly onto the mass while rotating the drum. The agglomerates are then conveyed in co-current contact with the heated air to the conduit 26. At this point, cooling air drawn into drum 10 through apertures 20 contacts the dried, heated agglomerate material in a countercurrent fashion in the cooling zone extending from the open entrance end 30 of conduit 26 to the discharge 14 of drum 10. The baffle means 34 and/or conically shaped inlet 30 may serve to regulate the velocity of gas entering the conduit so that dust and/or small particles are fluidized and pass out of the drum along with spent air while heavier particles separate out and are discharged at 14. The blower 40 draws the air together with any fluidized particles through conduit 26 and feeds the same to cyclone separator 44 via line 42. The cooled, dry agglomerate material is discharged at 14 and fed to the grading means 25 via conveyor 22 and elevator 24.

The invention as described above may be used for the drying and cooling of all sorts of plant food agglomerates to obtain durable pellets or like products. Typical compositions for treatment herein include urea, ammonium nitrate, superphosphates or other nitrogen- and/or phosphorous-containing materials separately or in combination. Potassium salts as such or in mixture with one or more of the materials indicated above may also be processed in the manner described herein. As will be appreciated by those skilled in the art, the materials to be processed herein may be prepared by mixing the active component or components with water (usually enough to give a 3–10% moisture content). This gives a more or less plastic mass which can be agglomerated under controlled conditions of temperature and mechanical motion. As noted earlier herein, these agglomerates comprise a balance between solid phase and surrounding solution phase and, as moisture is removed from the surface thereof dry durable pellets or discrete particles may be obtained.

Various modifications may be made in the invention described herein. For example, the system shown in FIGURE 2 may be modified to include additional screen and/or other particle separating means. Additionally, the fan and motor arrangement represented at 40 and 41 may be moved from the position shown in FIGURE 2 to a point adjacent the separator 44. Other modifications will also be apparent to those skilled in the art.

Hence the scope of the invention is defined in the following claims wherein:

1. Apparatus for continuously drying and cooling moist agglomerates, said apparatus comprising a rotatable continuous cylindrical drum having a fully open material inlet end and a substantially closed material discharge end, said discharge end being disposed opposite said inlet end and being connected to said inlet end by means of a continuous cylindrical wall, said discharge end being provided with outlet means to discharge dried and cooled agglomerates therefrom; means for supplying moist agglomerates to said inlet end; means for supplying a hot drying gas to said inlet end to dry agglomerates fed into said drum; said drum being tipped downwardly for advancing said agglomerates through said drum from the inlet end to said discharge end; conduit means spaced concentric with the longitudinal axis of said drum extending inwardly from an opening therefor in the discharge end of said drum, said conduit means terminating in an inner opening having an outwardly curved end at a point within said drum and intermediate the ends thereof, the curved end of said conduit means being spaced a relatively short distance from the cylindrical wall of the drum, the curved end and cylindrical wall forming a drying zone with the inlet end of said drum and forming a cooling zone with the discharge end of said drum; cooling gas openings in the cylindrical wall of the drum near the discharge end and extending around the periphery of the cylindrical wall; means at the discharge end of the drum for feeding cooling gas into the cooling gas openings and then into said drum and means associated with the conduit means and operative through the open inner end thereof for drawing drying gas and cooling gas through said drying and cooling zones respectively, and discharging said gases from said drum, wherein the drying gas is supplied in heated condition to the open inlet end from a source outside said apparatus.

2. The apparatus of claim 1 including means for separating entrained solids from the gases discharged from said drum.

3. The apparatus of claim 2 including means for classifying solids discharged from said drum.

4. The apparatus of claim 3 including baffles on said conduit means for directing the flow of said cooling gas.

5. The apparatus of claim 1 including means for granulating material within said drum.

6. The apparatus of claim 5 wherein said granulating means include baffles.

7. The apparatus of claim 1 wherein the means for supplying cooling gas to said drum includes an apertured collar around the discharge end of said drum to control the amount of cooling gas supplied to the cooling gas openings.

References Cited by the Examiner
UNITED STATES PATENTS

| | | | |
|---|---|---|---|
| 2,039,645 | 5/1936 | Hechenbleikner | 34—63 |
| 2,095,086 | 10/1937 | Slemmer | 34—63 |
| 2,677,195 | 5/1954 | Menning | 34—63 |
| 2,857,684 | 10/1958 | Halldorsson | 34—66 |

JOHN J. CAMBY, *Acting Primary Examiner.*

JOHN F. O'CONNOR, *Examiner.*